United States Patent
Kawasaki (10) Patent No.: US 10,736,067 B2
(45) Date of Patent: Aug. 4, 2020

(54) RADIO COMMUNICATION SYSTEM, TERMINAL DEVICE, BASE STATION DEVICE AND RADIO COMMUNICATION METHOD

(71) Applicant: FUJITSU LIMITED, Kawasaki-shi, Kanagawa (JP)

(72) Inventor: Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 56 days.

(21) Appl. No.: 16/116,290

(22) Filed: Aug. 29, 2018

(65) Prior Publication Data

US 2019/0021063 A1 Jan. 17, 2019

Related U.S. Application Data

(63) Continuation of application No. PCT/JP2016/057815, filed on Mar. 11, 2016.

(51) Int. Cl.
*H04J 3/06* (2006.01)
*H04W 56/00* (2009.01)
*H04L 7/00* (2006.01)

(52) U.S. Cl.
CPC ......... *H04W 56/003* (2013.01); *H04L 7/0091* (2013.01); *H04W 56/0045* (2013.01)

(58) Field of Classification Search
CPC ............ H04W 56/003; H04W 56/0045; H04L 7/0091

See application file for complete search history.

(56) References Cited

U.S. PATENT DOCUMENTS

| | | | | |
|---|---|---|---|---|
| 7,647,060 B2 * | 1/2010 | Kawamura | ....... | H04W 56/0045 370/335 |
| 8,095,161 B2 * | 1/2012 | Sandberg | .......... | H04W 56/0045 455/502 |

(Continued)

FOREIGN PATENT DOCUMENTS

| | | |
|---|---|---|
| EP | 2 259 461 A1 | 12/2010 |
| JP | 8-130765 A | 5/1996 |

(Continued)

OTHER PUBLICATIONS

Extended European search report with supplementary European search report and the European search opinion with annex issued by the European Patent Office for corresponding European Patent Application No. 16893538.5, dated Feb. 15, 2019.

(Continued)

*Primary Examiner* — Hanh N Nguyen
(74) *Attorney, Agent, or Firm* — Myers Wolin, LLC (57) ABSTRACT

A radio communication system includes a first radio device and a second radio device. The first radio device includes: a generator configured to generate a transmission signal sent to the second radio device; an adjuster configured to adjust timing of transmission of the transmission signal generated by the generator according to information on transmission timing; a transmitter configured to transmit the transmission signal at the timing of transmission adjusted by the adjuster; and a timer configured to measure elapsed time after the timing of transmission adjusted by the adjuster is set at given synchronization timing. The generator generates a transmission signal in which at least one symbol contains no data when the elapsed time measured by the timer is equal to or larger than a first threshold.

3 Claims, 9 Drawing Sheets

(56) References Cited

U.S. PATENT DOCUMENTS

| | | |
|---|---|---|
| 9,655,160 B2 | 5/2017 | Feuersaenger et al. |
| 2014/0016620 A1 | 1/2014 | Singh et al. |
| 2014/0086219 A1 | 3/2014 | Suzuki et al. |
| 2014/0119302 A1 | 5/2014 | Ann et al. |
| 2014/0140315 A1 | 5/2014 | Kim et al. |

FOREIGN PATENT DOCUMENTS

| | | |
|---|---|---|
| JP | 2015-534341 A | 11/2015 |
| JP | 2016-502312 A | 1/2016 |
| WO | 2016/021033 A1 | 2/2016 |

OTHER PUBLICATIONS

International Search Report with Written Opinion of the International Searching Authority issued by the Japan Patent Office for corresponding International Patent Application No. PCT/JP2016/057815, dated May 24, 2016, with an English translation.
Nokia Siemens Networks et al., "UL sounding", Agenda Item: 7.11.2, 3GPP TSG-RAN WG1 Meeting #49, R1-072296, Kobe, Japan, May 7-11, 2007.
Communication pursuant to Article 94(3) EPC issued by the European Patent Office for corresponding European Patent Application No. 16 893 538.5-1205, dated Feb. 24, 2020.

* cited by examiner

RADIO COMMUNICATION SYSTEM, TERMINAL DEVICE, BASE STATION DEVICE AND RADIO COMMUNICATION METHOD

CROSS-REFERENCE TO RELATED APPLICATION

This application is a continuation of International Application No. PCT/JP2016/057815, filed on Mar. 11, 2016 and designating the U.S., the entire contents of which are incorporated herein by reference.

FIELD

The present invention relates to a radio communication system, a terminal device, a base station device and a radio communication method.

BACKGROUND

In a radio link of an uplink radio access unit according to LTE (Long Term Evolution) whose specification is formulated according to 3GPP ($3^{rd}$ generation partnership project) and whose functions are kept being extended, transmission timing control is applied to uplink radio signals that are transmitted from radio terminal devices. In a radio base station, reception timing of uplink signals that are transmitted from the radio terminal devices is measured and the radio base station transmits a control signal containing a transmission timing adjustment amount to each of the radio terminals such that a difference between the measured reception timing and reference timing is equal to or smaller than a given specified value (for example, the length of a cyclic prefix or a guard interval that is used for uplink signals).

Performing such transmission timing control achieves low mutual interference between signals from respective radio terminals that are transmitted via uplink radio links, enables improvement in transmission characteristics and thus improves data throughput characteristics in radio uplinks. Physically, it is assumed that radio synchronization is achieved when the aforementioned difference between the reception timing and the reference timing is equal to or smaller than the specified value. In order to maintain radio synchronization reliably, it is ideal that the radio base station constantly performs reception timing measurement on signals from the ratio terminals and transmission of control signals for transmission timing adjustment based on the result of the measurement to the radio terminals. With an increase in consumption of radio resources, however, power consumption of the radio terminals also increases.

In LTE, timers are used in order to maintain radio synchronization more easily. A radio terminal initializes and resets a timer on receiving a control signal for transmission timing adjustment from the radio base station, starts elapsed time measurement from 0 and, until the elapsed time reaches a given time of which the radio terminal is notified by the radio base station separately, regards that uplink radio synchronization is maintained. When the elapsed time exceeds the given time, the radio terminal regards that radio synchronization is not maintained (asynchronous). When a new control signal for adjusting transmission timing is received before the elapsed time reaches the given time, the timer is reset and the elapsed time is measured from 0.

Patent Literature 1: Japanese Laid-open Patent Publication No. 08-130765

Patent Literature 2: Japanese National Publication of International Patent Application No. 2015-534341

When the elapsed time in the timer in a radio terminal exceeds the given time and the radio terminal is regarded as entering an asynchronous state, periodic radio resources that have been assigned to the radio terminal (such as a control channel used to report radio characteristics of a radio downlink, a control channel used to request assignment of radio resources of a radio uplink, and a pilot signal that is transmitted to evaluate radio characteristics of the radio uplink) are all released. Furthermore, control signals for granting transmission of uplink signals are not transmitted to the radio terminal. In order for a radio terminal in which the elapsed time of the timer exceeds a given time and thus the radio terminal enters the asynchronous state to transmit an uplink signal, a radio synchronization establishment process starting with transmission of random access signals is to be performed to re-establish radio uplink synchronization. As a result, the data throughput decreases.

In order to avoid such a situation, it is necessary that a control signal for adjusting transmission timing is transmitted to each radio terminal before the elapsed time in the timer of the radio terminal reaches the given time. When radio resources are consumed to transmit control signals for adjusting transmission timing and the number of radio terminals increases, the amount of consumption of radio resources can become considerable. As a control signal for adjusting transmission timing does not contain user data, frequent transmission of control signals for adjusting transmission timing leads to deterioration of throughput characteristics with respect to user data.

In a different viewpoint, when the synchronous state of a radio uplink is determined based on the elapsed time of timers, matching with respect to elapsed time is needed between the timer in each radio terminal and a timer corresponding to each radio terminal on the side of the radio base station, which leads to an increase in difficulty in system control and in circuit scale.

SUMMARY

According to an aspect of an embodiment of the invention, A radio communication system includes a first radio device and a second radio device. The first radio device includes: a generator configured to generate a transmission signal sent to the second radio device; an adjuster configured to adjust timing of transmission of the transmission signal generated by the generator according to information on transmission timing; a transmitter configured to transmit the transmission signal at the timing of transmission adjusted by the adjuster; and a timer configured to measure elapsed time after the timing of transmission adjusted by the adjuster is set at given synchronization timing. The generator generates a transmission signal in which at least one symbol contains no data when the elapsed time measured by the timer is equal to or larger than a first threshold.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Embodiments of a radio communication system, a terminal device, a base station device and a radio communication method disclosed herein will be described in detail below with reference to the drawings. The embodiments do not limit the present invention.

[a] First Embodiment

Figure 1:
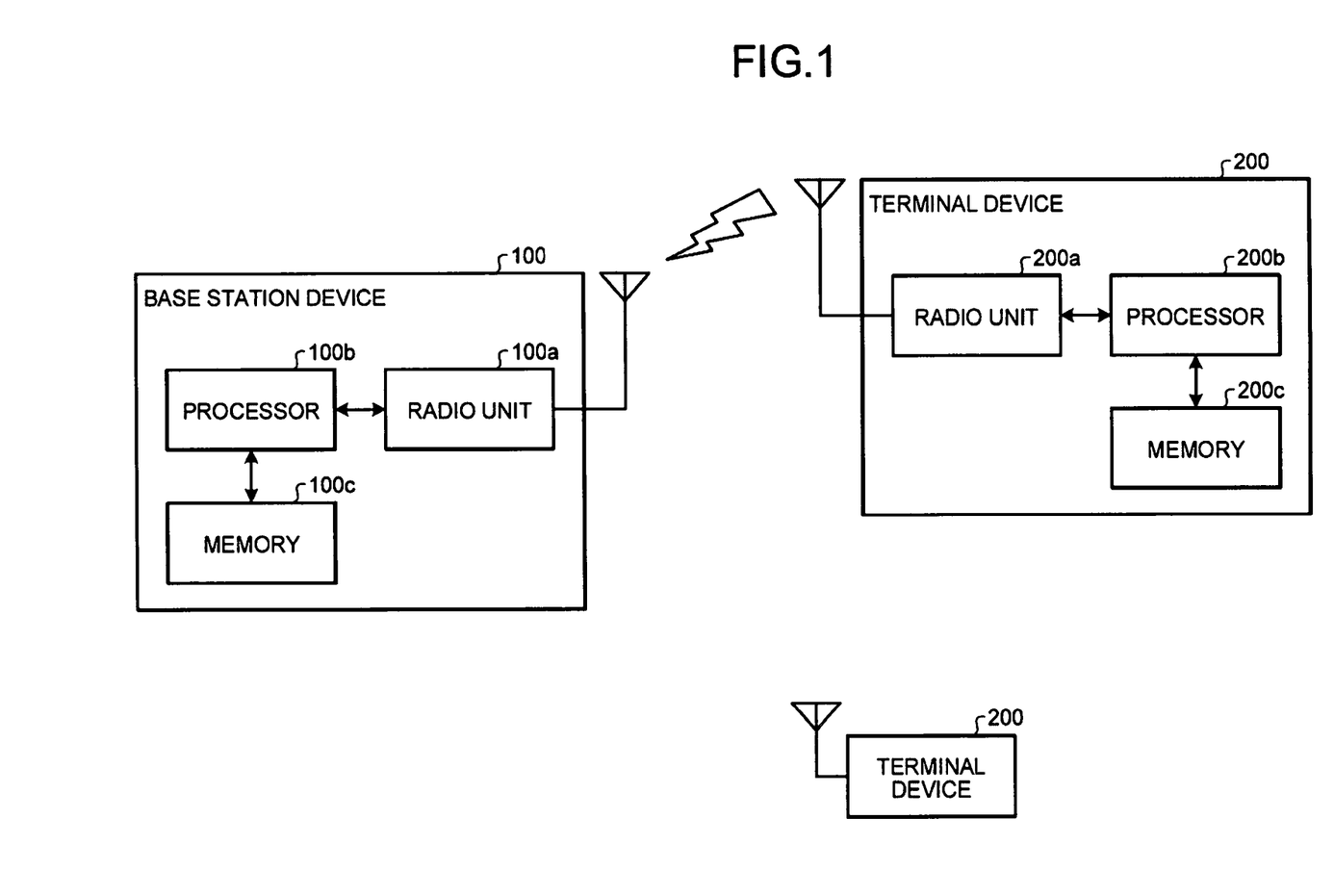
FIG. 1 is a diagram illustrating a configuration of a radio communication system according to a first embodiment.

FIG. 1 is a diagram illustrating a configuration of a radio communication system according to a first embodiment. As illustrated in FIG. 1, the radio communication system includes a base station device 100 and a plurality of terminal devices 200. The base station device 100 and the terminal device 200 execute mutual radio communication. Signals that are transmitted from the base station device 100 to the terminal devices 200 are referred to as downlink signals and signals that are transmitted from the terminal devices 200 to the base station device 100 are referred to as uplink signals below.

The base station device 100 includes a radio unit 100a, a processor 100b and a memory 100c. The radio unit 100a performs given radio transmission processing on a downlink signal that is output from the processor 100b and then transmits the downlink signal via an antenna. The radio unit 100a receives a signal via the antenna and performs given radio reception process on the uplink signal.

The processor 100b includes, for example, a central processing unit (CPU), a field programmable gate array (FPGA) or a digital signal processor (DSP) and performs overall control on the entire base station device 100. In other words, the processor 100b codes and modulates transmission data to generate a downlink signal and outputs the downlink signal to the radio unit 100a. The processor 100b demodulates and decodes an uplink signal that is input from the radio unit 100a to receive reception data. The memory 100c includes a random access memory (RAM) or a read only memory (ROM) and, when the processor 100b executes processing, stores various types of information. The configuration of the base station device 100 will be described in detail below.

The terminal device 200 includes a radio unit 200a, a processor 200b and a memory 200c. FIG. 1 illustrates the configuration of the single terminal device 200 and other terminal devices 200 have the same configuration.

The radio unit 200a receives downlink signals via an antenna and performs given radio receiving processing on the downlink, signals. The radio unit 200a performs given radio transmission processing on an uplink signal that is output from the processor 200b and then transmits the uplink signal via the antenna.

The processor 200b includes, for example, a CPU, a FPGA or a DSP and performs overall control on the entire terminal device 200. In other words, the processor 200b demodulates and decodes a downlink signal that is input from the radio unit 200a to receive reception data. The processor 200b codes and modulates transmission data to generate an uplink signal and outputs the uplink signal to the radio unit 200a. The memory 200c includes, for example, a RAM or a ROM and, when the processor 200b executes processing, stores various types of information. The configuration of the terminal device 200 will be described in detail below.

Figure 2:
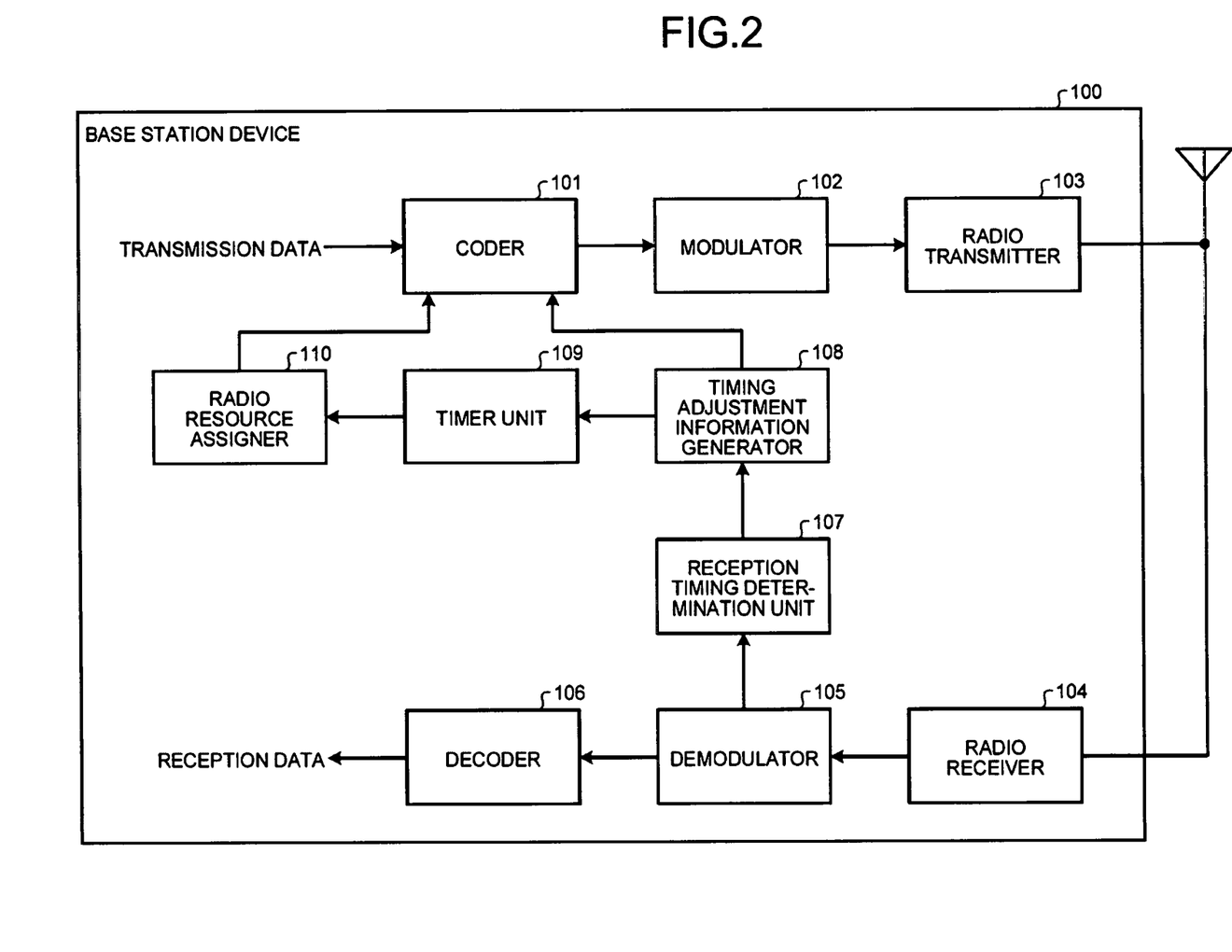
FIG. 2 is a block diagram illustrating a configuration of a base station device according to the first embodiment.

FIG. 2 is a block diagram illustrating a configuration of the base station device 100 according to the first embodiment. The base station device 100 illustrated in FIG. 2 includes a coder 101, a modulator 102, a radio transmitter 103, a radio receiver 104, a demodulator 105, a decoder 106, a reception timing determination unit 107, a timing adjustment information generator 108, a timer unit 109 and a radio resource assigner 110. The radio transmitter 103 and the radio receiver 104 correspond to the radio unit 100a represented in FIG. 1 and other processors correspond to the processor 100b represented in FIG. 1.

The coder 101 codes transmission data and control information and outputs the resultant coded data to the modulator 102. Specifically, the coder 101 codes the transmission data to the terminal device 200 and codes control information containing transmission grant information that grants the terminal device 200 to transmit an uplink signal and timing adjustment information to adjust timing of transmission performed by the terminal device 200.

The modulator 102 modulates the coded data that is output from the coder 101 and outputs the resultant modulated data to the radio transmitter 103.

The radio transmitter 103 performs radio transmission processing, such as digital/analog (D/A) conversion and upconversion, on the modulated data that is output from the modulator 102 and transmits a downlink signal with the resultant radio frequency via the antenna.

The radio receiver 104 receives an uplink signal via the antenna and performs radio reception processing, such as downconversion and analog/digital (A/D) conversion, on the uplink signal.

The demodulator 105 demodulates the uplink signal that is output from the radio receiver 104 and outputs the resultant demodulated data to the decoder 106.

The decoder 106 decodes the demodulated data that is output from the demodulator 105 and acquires reception data.

The reception timing determination unit 107 compares timing of reception of the uplink signal with synchronization reference timing and determines how much the reception timing is different from the synchronization reference timing. Specifically, the reception timing determination unit 107 use the beginning of a unit time length of a radio signal, such as an OFDM symbol, a slot or a subframe, as the synchronization reference timing to measure the difference between the timing of reception of the uplink signal and the synchronization reference timing.

The timing adjustment information generator 108 generates timing adjustment information to adjust timing of transmission of an uplink signal in the terminal device 200 based on the difference between the reception timing and the synchronization reference timing that is measured by the reception timing determination unit 107. In other words, for example, when the reception timing is ahead of the synchronization reference timing, the timing adjustment information generator 108 generates timing adjustment information to delay the timing of transmission in the terminal device 200 by the difference between the reception timing and the synchronization reference timing. For example, when the reception timing is behind the synchronization reference timing, the timing adjustment information generator 108 generates timing adjustment information to put the transmission timing in the terminal device 200 forward by the difference between the reception timing and the synchronization reference timing. As described above, the timing adjustment information generator 108 generates timing adjustment information to adjust the timing of transmission by the terminal device 200 such that the difference between the reception timing and the synchronization reference timing decreases and outputs the generated timing adjustment information to the coder 101.

The timing adjustment information generator 108 does not always generate timing adjustment information to all the terminal devices 200 but generates timing adjustment information, not causing any excess of processing load of the processor 100$b$ over a given reference. The timing adjustment information generator 108 may preferentially generate timing adjustment information to, for example, the terminal device 200 at a high travel speed or the terminal device 200 that transmits uplink signals frequently.

The timer unit 109 includes timers corresponding to the terminal devices 200, respectively, and, each time timing adjustment information to each terminal device 200 is generated and transmitted by the timing adjustment information generator 108, resets the timer corresponding to the corresponding terminal device 200. The timer unit 109 measures elapsed time from the resetting with respect to each terminal device 200 and ends the timer corresponding to the terminal device 200 whose corresponding elapsed time has reached a given time. Also when new timing adjustment information is transmitted to a terminal device 200 before the elapsed time in the time corresponding to the terminal device 200 reaches the given time, the timer corresponding to the terminal device 200 is reset.

The radio resource assigner 110 executes scheduling to assign radio resources for transmitting uplink signals to each terminal device 200. The radio resource assigner 110 refers to the timers of the timer unit 109 and executes scheduling on the terminal device 200 whose corresponding timer has not ended. In other words, the radio resource assigner 110 gives an opportunity to transmit an uplink signal to the terminal device 200 for which the given time has not elapsed yet from adjustment on the uplink signal transmission timing. The radio resource assigner 110 generates transmission grant information to the terminal device 200 that is permitted to transmit uplink signals according to the result of the scheduling and outputs the transmission grant information to the coder 101.

Figure 3:
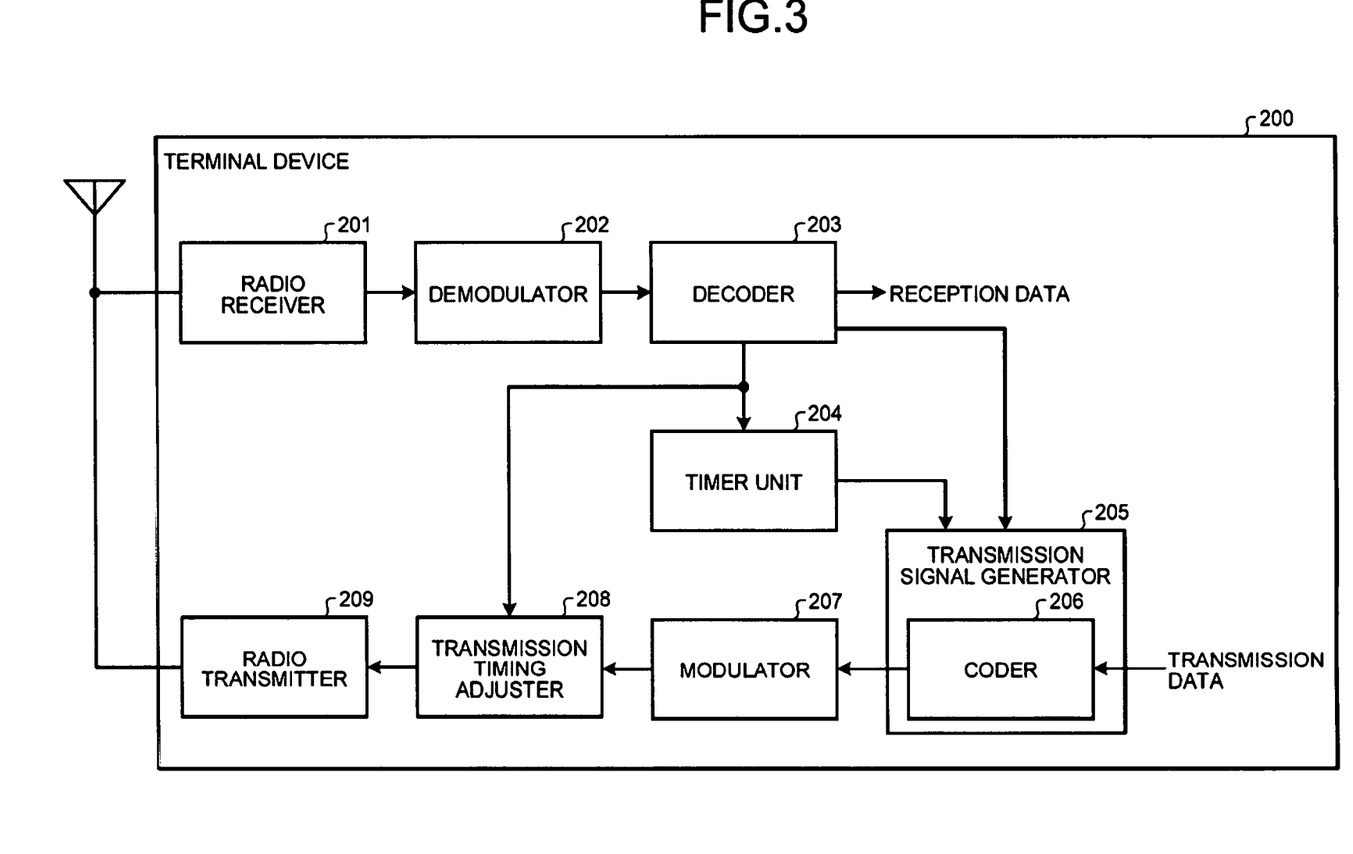
FIG. 3 is a block diagram illustrating a configuration of a terminal device according to the first embodiment.

FIG. 3 is a block diagram illustrating a configuration of the terminal device 200 according to the first embodiment. The terminal device 200 illustrated in FIG. 3 includes a radio receiver 201, a demodulator 202, a decoder 203, a timer unit 204, a transmission signal generator 205, a modulator 207, a transmission timing adjuster 208 and a radio transmitter 209. The radio receiver 201 and the radio transmitter 209 correspond to the radio unit 200$a$ represented in FIG. 1 and other processors correspond to the processor 200$b$ represented in FIG. 1.

The radio receiver 201 receives a downlink signal via the antenna and performs radio reception processing, such as downconversion and A/D conversion, on the downlink signals.

The demodulator 202 demodulates the downlink signal that is output from the radio receiver 201 and outputs the resultant demodulated data to the decoder 203.

The decoder 203 decodes the demodulated data that is output from the demodulator 202 to obtain reception data. As a consequence of decoding the demodulated data, when the demodulated data contains timing adjustment information, the decoder 203 outputs the timing adjustment information to the timer unit 204 and the transmission timing adjuster 208. Furthermore, as a consequence of decoding the demodulated data, when transmission grant information is contained in the demodulated data, the decoder 203 outputs the transmission grant information to the transmission signal generator 205.

The timer unit 204 is reset each time timing adjustment information is output from the decoder 203 and measures elapsed time from the resetting. In other words, the timer unit 204 measures the elapsed time from when the transmission timing is adjusted based on timing adjustment information. When the elapsed time reaches a given time T1 without resetting, the timer unit 204 notifies the transmission signal generator 205 that the given time T1 has ended. When the elapsed time reaches a given time T2 without resetting after the elapsed time reaches the given time T1, the timer unit 204 notifies the transmission signal generator 205 that the given time T2 (>T1) has ended. Until the given time T1 ends, synchronization between the terminal device 200 and the base station device 100 is established and the uplink signal that is transmitted from the terminal device 200 does not interfere with an uplink signal that is transmitted from another terminal device.

Until the given time T2 ends after the given time T1 ends, the timing of transmission by the terminal device 200 is slightly different from the synchronization reference timing but the amount of the difference is not large. Accordingly, until the given time T2 ends, there is a possibility that only a part of the front or rear of the uplink signal that is transmitted from the terminal device 200 would interfere with an uplink signal from another terminal device that is transmitted temporally ahead of (or behind) the uplink signal. Whether the front part of the uplink signal gives interference or the rear part gives interference is determined according to whether the uplink signal transmission timing is temporally ahead of or behind desired timing. This relates to, for example, the direction in which the terminal device 200 moves. When uplink signals from multiple terminal devices 200 are simultaneously transmitted by frequency division multiplexing in the same time segment (for example, an uplink radio subframe), interference between the signals in a frequency area due to the difference in transmission timing is caused; however, filtering is performed in the base station device 100 on the reception signals from the respective terminal devices 200 and thus interference in the frequency area is inhibited.

When the transmission grant information is output from the decoder 203, the transmission signal generator 205 maps transmission data onto generate a transmission signal. Specifically, the transmission signal generator 205 includes a coder 206. On receiving the transmission grant information granting transmission of uplink signals, the coder 206 codes the transmission data and outputs the resultant coded data to the modulator 207.

The transmission signal generator 205 executes different types of mapping according to whether the timer unit 204 notifies the transmission signal generator 205 of the end of the given time T1. In other words, until the given time T1 ends, the transmission signal generator 205, for example, maps the transmission data onto all multiple symbols corresponding to one subframe to generate the transmission signal. On the other hand, until the given time T2 ends after the given time T1 ends, the transmission signal generator 205 generates a transmission signal that is shortened and in which the transmission data is not mapped onto at least a single or multiple front or rear symbols among the multiple symbols of the subframe (hereinafter, "shortened signal"). The symbols herein refer to OFDM symbols in a case where the transmission signal is an OFDM signal. When one subframe consists of N OFDM symbols, generation of a shortened signal can be executed by changing (increasing) the value of a code rate to transmit data that is to be transmitted using the subframe by the N OFDM symbols such that the data is transmitted by (N−1) OFDM symbols. Such a signal processing method may be referred to as rate matching.

When the transmission signal generator 205 generates a shortened signal, for example, after the coder 206 codes the transmission data, a shortened signal in which the transmission data is not mapped onto a single or multiple front or rear symbols by puncturing to interpolate coded bits may be generated. In this case, it can be realized by, after the data is mapped onto the symbols in one subframe, transmitting the subject symbol part (front or rear symbol) without amplitude in the process of transmitting the subframe. For example, a shortened signal may be generated by the coder 206 by coding the transmission data by a code rate different from a code rate that is specified by the base station device 100 and reducing redundant bits added to the transmission data. For example, a shortened signal may be generated by the coder 206 by reducing an amount of transmission data to be assigned to one subframe. In this case, the terminal device 200 may insert information about a code rate that is employed and an amount of transmission data into the same subframe and transmit the information to the base station device 100.

After the given time T2 ends, the transmission signal generator 205 stops generating transmission signals until the timer unit 204 is reset. In other words, after the given time T2 ends, there is a possibility that the timing of transmission by the terminal device 200 may largely differ from the synchronization reference timing and characteristic deterioration due to interference with an uplink signal that is transmitted from another terminal device may be too large to ignore, and therefore the terminal device 200 stops transmitting uplink signals. In this case, when new timing adjustment information is received and the transmission timing is adjusted to recover the synchronous state and the timer unit 204 is reset, transmission of uplink signals is enabled again.

The modulator 207 modulates the coded data that is output from the coder 206 and outputs the resultant modulated data to the transmission timing adjuster 208. The modulated coded data is a normal transmission signal in which the transmission data is mapped onto all symbols of one subframe or a shortened signal in which the transmission data is not mapped onto a single or multiple front or rear symbols of one subframe.

The transmission timing adjuster 208 sets transmission timing according to the timing adjustment information that is output from the decoder 203 and adjusts timing of transmission of an uplink signal. In other words, the transmission timing adjuster 208 puts the uplink signal transmission timing ahead or behind according to the timing adjustment information to maintain the difference between the timing of reception of the uplink signal to be transmitted in the base station device 100 and the synchronization reference timing at a given value or smaller. The transmission timing adjuster 208 then causes the modulated data that is output from the modulator 207 to be output from the radio transmitter 209 at the set transmission timing.

The radio transmitter 209 performs radio transmission processing, such as D/A conversion and frequency up-conversion, on the modulated data for which the transmission timing is adjusted by the transmission timing adjuster 208 and transmits the resultant uplink signal with the resultant radio frequency via the antenna.

Figure 4:
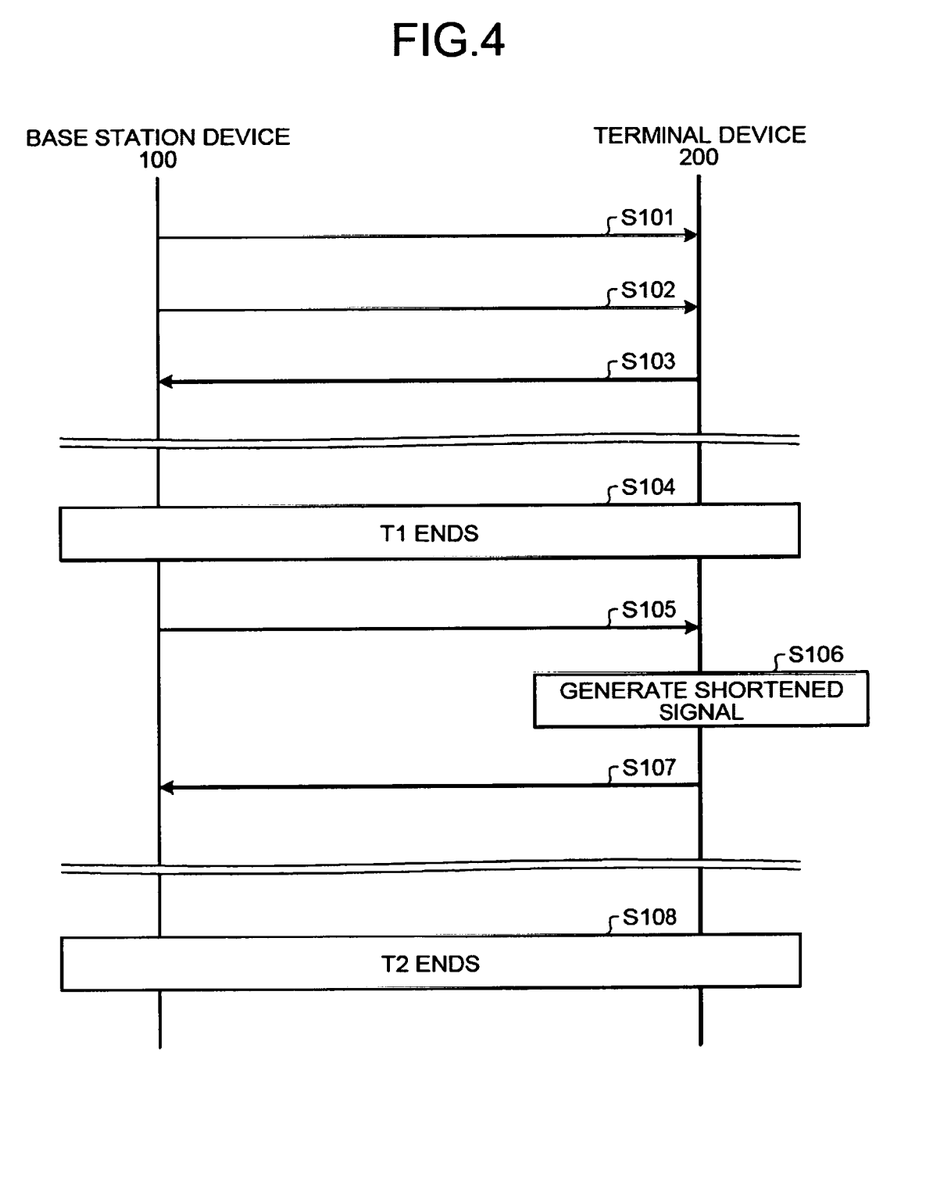
FIG. 4 is a sequence chart illustrating a radio communication method according to the first embodiment.

The radio communication method in the radio communication system configured as descried above will be described with reference to the sequence chart represented in FIG. 4.

When an uplink signal from the terminal device 200 is received in the base station device 100, a difference between the timing of reception of the uplink signal and the synchronization reference timing is measured by the reception timing determination unit 107. The uplink signal need not necessarily include data and, for example, may be a pilot signal that the terminal device 200 transmits in order to cause the base station device 100 to measure radio uplink characteristics. In a LTE radio uplink, for example, a sounding reference signal (SRS) is used as a pilot signal (or a reference signal) for such a purpose.

When the difference between the reception timing and the synchronization reference timing is larger than a desired value according to the result of measuring the reception timing and it is determined to adjust the timing of transmission by the terminal device 200, timing adjustment information is generated by the timing adjustment information generator 108 and the generated timing adjustment information is inserted into a control signal, or the like, and is transmitted from the base station device 100 to the terminal device 200 (step S101). Also when the terminal device 200 establishes synchronization with the base station device 100 by performing to random access processing, timing adjustment information is transmitted from the base station device 100 to the terminal device 200. When timing adjustment information is transmitted, the timer unit 109 resets the timer corresponding to the terminal device 200.

The timing adjustment information is received by the terminal device 200 and the timing of transmission in the transmission timing adjuster 208 is adjusted. Accordingly, the difference between the timing of reception of an uplink signal in the base station device 100 and the synchronization reference timing becomes equal to or smaller than the desired given value and uplink signals from the terminal device 200 do not interfere with uplink signals from another terminal device. As the timing adjustment information is received, the timer unit 204 is reset.

Thereafter, when transmission of uplink signals by the terminal device 200 is permitted according to scheduling performed by the radio resource assigner 110 of the base station device 100, transmission grant information is transmitted from the base station device 100 to the terminal device 200 (step S102).

The transmission grant information is received by the terminal device 200 and a transmission signal is generated by the transmission signal generator 205. Here, as the elapsed time that is measured by the timer unit 204 has not reached the given time T1 yet, the transmission signal generator 205 generates a transmission signal in which transmission data is mapped onto all symbols of one subframe. The transmission signal is transmitted to the base station device 100 at the transmission timing that is adjusted by the transmission timing adjuster 208 (step S103).

Thereafter, until the given time T1 ends without transmission of new timing adjustment information from the base station device 100, uplink signals are transmitted from the terminal device 200 according to the scheduling. After the given time T1 ends (step S104), transmission of uplink signals by the terminal device 200 is permitted continuously according to scheduling and transmission grant information is transmitted from the base station device 100 to the terminal device 200 (step S105).

The transmission grant information is received by the terminal device 200 and a transmission signal is generated by the transmission signal generator 205. Here, as the timer unit 204 notifies the transmission signal generator 205 of the fact that the given time T1 has ended, the transmission signal generator 205 generates a shortened signal in which transmission data is not mapped onto the front or rear symbol of one subframe (step S106). The shortened signal is transmitted to the base station device 100 at the transmission timing that is adjusted by the transmission timing adjuster 208 (step S107).

After the given time T1 elapses after the uplink signal transmission timing is adjusted, there is a possibility that the difference between the timing of reception of an uplink signal, which is transmitted based on the transmission timing that is adjusted by the transmission timing adjuster 208, in the base station device 100 and the synchronization reference timing may exceed the desired value. In this case, there is a possibility that part of the front or rear of an uplink signal to be transmitted from the terminal device 200 may interfere with an uplink signal that is transmitted from another terminal device.

In the embodiment however, after the given time T1 ends, a shortened signal in which transmission data is not mapped onto the front or rear symbol in the subframe is transmitted as an uplink signal. Accordingly, even when correction of the timing of transmission by the terminal device 200 is not performed and the difference between the timing of reception in the base station device 100 and the synchronization reference timing exceeds the desired value, the effect on uplink signals from another terminal devices decrease. Note that, when the effect increases more than assumed, the base station device 100 may immediately transmit timing adjustment information to the terminal device 200.

Also after the given time T1 elapses after adjustment of the uplink signal transmission timing, the terminal device 200 is able to transmit uplink signals without executing random accesses again. In other words, the terminal device 200 is able to promptly transmit uplink signals promptly and inhibit the throughput from decreasing.

When the given time T2 ends (step S108), the timer corresponding to the terminal device 200 in the timer unit 109 of the base station device 100 ends and the terminal device 200 is excluded from subjects of scheduling. In other words, after the given time T2 elapses after transmission of the timing adjustment information, no opportunity to transmit uplink signals is given to the terminal device 200. The given time T2 ends also in the timer unit 204 of the terminal device 200 and generation of transmission signals by the transmission signal generator 205 is suspended. As described above, after the given time T2 ends after the timing adjustment information is transmitted, there is a possibility that the difference between the timing of reception of an uplink signal, which is transmitted from the terminal device 200, in the base station device 100 and the synchronization reference timing may differ largely from the desired value. For this reason, not permitting transmission of uplink signals avoids putting interference with uplink signals from another terminal device.

When the terminal device 200 transmits an uplink signal after the given time T2 ends, the terminal device 200 transmits random access signals to the base station device 100. After the desired time T2 ends, the terminal device 200 is unable to transmit any ACK/NACK signal corresponding to a data signal that is transmitted via a downlink. In other words, the base station device 100 is unable to transmit data signals associated with a ACK/NACK response to the terminal device 200. For this reason, when it is necessary for the base station device 100 to transmit a data signal to the terminal device 200 after the given time T2 ends, the base station device 100 transmits a control signal of an instruction to transmit random access signals to the terminal device 200 prior to transmission of the data signal.

Figure 5:
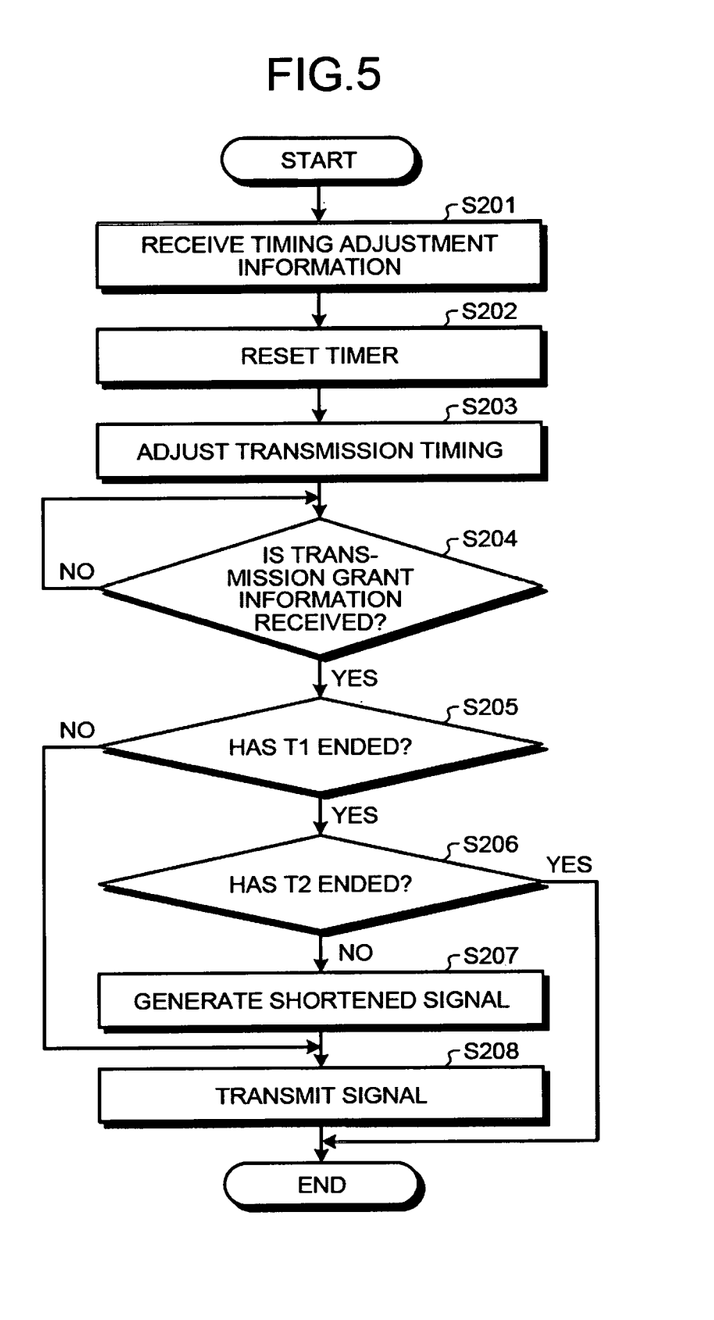
FIG. 5 is a flowchart illustrating operations of the terminal device according to the first embodiment.

Operations of the terminal device 200 according to the first embodiment will be specifically described with reference to the flowchart represented in FIG. 5.

In the base station device 100, when the difference between the timing of reception of an uplink signal from the terminal device 200 and the synchronization reference timing exceeds the desired value, timing adjustment information to adjust timing of transmission in the terminal device 200 is transmitted. The timing adjustment information is not constantly transmitted when the difference between the uplink signal reception timing and the synchronization reference timing exceeds the desire value and timing adjustment information is transmitted or not transmitted according to the processing load of the base station device 100 and the sufficiency of radio resources needed to transmit timing adjustment information. When there are a lot of terminal devices and a terminal device that needs transmission timing adjustment is in a position distant from the base station device 100, the amount of radio resources needed to transmit timing adjustment information increases. When a lot of radio resources are used to transmit timing adjustment information, sufficiency of available radio resources to transmit user data decreases and thus the base station device 100 may have to delay part of adjustment of transmission timing in part of the terminal devices.

When the timing adjustment information is received by the radio receiver 201 of the terminal device 200 (step S201), the timing adjustment information is output to the timer unit 204 and the transmission timing adjuster 208. The timer unit 204 is then reset (step S202) and the uplink signal transmission timing is adjusted in the transmission timing adjuster 208 (step S203). After being reset, the timer unit 204 measures an elapsed time until timing adjustment information is received again and, when the elapsed time reaches the given time T1 or the given time T2, notifies the transmission signal generator 205 of the fact.

When transmission data that is to be transmitted from the terminal device 200 occurs, the transmission data is queued until transmission grant information from the base station device 100 is received (NO at step S204). When radio resources are assigned to the terminal device 200 according to scheduling performed by the radio resource assigner 110 of the base station device 100, transmission grant information that is transmitted from the base station device 100 is received by the radio receiver 201 (YES at step S204). The transmission grant information is output to the transmission signal generator 205 and whether the given time T1 has already ended is determined by the transmission signal generator 205 (step S205).

When the given time T1 has not ended yet according to the result of the determination (NO at step S205), a normal transmission signal is generated by the transmission signal generator 205 and is transmitted at the transmission timing that is adjusted by the transmission timing adjuster 208 (step S208). On the other hand, when the given time T1 has already ended (YES at step S205), whether the given time T2 has ended is further determined by the transmission signal generator 205 (step S206).

When the given time T2 has ended according to the result of the determination (YES at step S206), as there is a possibility that the difference between the timing of reception of an uplink signal that is transmitted according to the transmission timing, which is adjusted by the transmission timing adjuster 208, in the base station device 100 and the synchronization reference timing may be largely different from the desired value, generation of transmission signals by the transmission signal generator 205 is suspended. On the other hand, when the given time T2 has not ended yet (NO at step S206), a shortened signal is generated by the transmission signal generator 205 (step S207). In other words, a shortened signal in which transmission data is not mapped onto at least a single or multiple front or rear symbols of one subframe is generated by the transmission signal generator 205.

When a shortened signal is generated, a coded bit obtained by coding the transmission data may be punctured by the coder 206 or coded bits obtained coding the transmission data may be reduced by changing the code rate. Furthermore, transmission data less than transmission data of one subframe may be coded by the coder 206. How a shortened signal is generated may be clearly indicated by the transmission grant information that is transmitted by the base station device 100 to the terminal device 200.

The shortened signal may be transmitted at the transmission timing that is adjusted by the transmission timing adjuster 208 (step S208). As the transmission timing that is adjusted by the transmission timing adjuster 208 is based on the timing adjustment information that is received at a time point before the elapsed time of the timer reaches the given time T1, there is a possibility that the difference between the timing of reception in the base station device 100 and the synchronization reference timing may exceed the desired value and, when the amount of elapsed time from the given time T1 is not large, it is assumed that the difference is not so large. For this reason, it is assumed that, even when a shortened signal in which transmission data is not mapped onto the front or rear symbol of one subframe is transmitted, interference with an uplink signal that is transmitted from another terminal device is not large.

Figure 6:
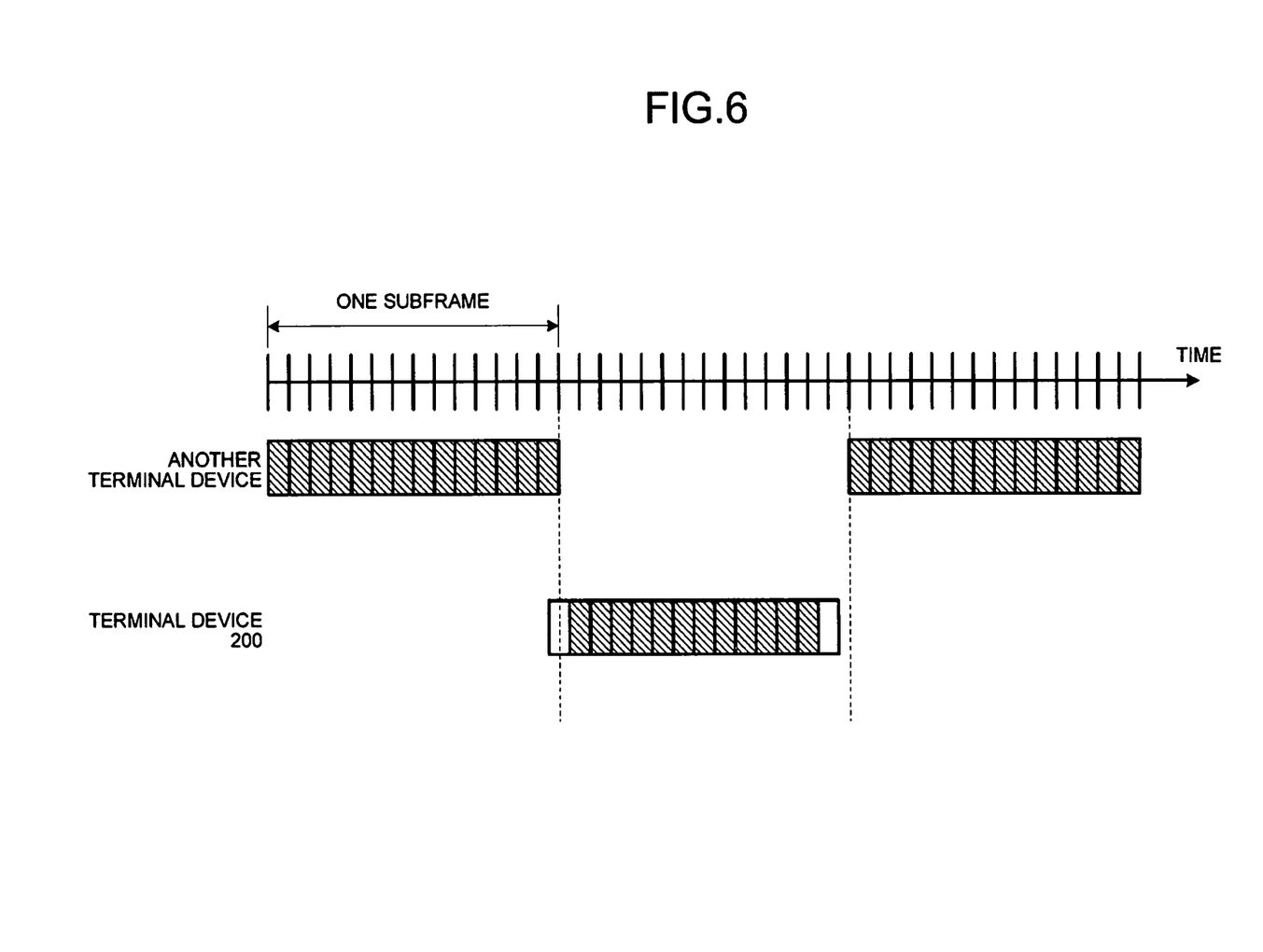
FIG. 6 is a diagram illustrating transmission of uplink signals performed by the terminal device.

Specifically, for example, as illustrated in FIG. 6, when the timing of transmission performed by the terminal device 200 differs from the synchronization reference timing, the top or end of an uplink signal from the terminal device 200 is received by the base station device 100 such that the top or end of the uplink signal partly overlaps an uplink signal from another terminal device. The uplink signal that is transmitted from the terminal device 200 however is a shortened signal in which transmission data is mapped onto only the part represented by slashed lines in FIG. 6 and the transmission data is not mapped onto the part represented in white. Thus, it is assumed that, as illustrated in FIG. 6, interference of the uplink signal from the terminal device 200 with the uplink signal of another terminal device is not large.

In a shortened signal, the number of symbols onto which transmission data is not mapped may be a fixed value or may be increased according to the elapsed time. In other words, for example, immediately after the given time T1 ends, the transmission data is not mapped onto each of one top and one symbols in one subframe and, each time a given time elapses, the number of symbols onto which the transmission data is not mapped may be increased by one symbol. In this case, the number of symbols onto which the transmission data is not mapped need not be equal between the front and rear in one subframe.

Furthermore, symbols onto which the transmission data is not mapped are not necessarily arranged on both the front and rear of one subframe. In other words, a shortened signal in which a symbol onto which the transmission data is not mapped is arranged only in the front of one subframe may be generated or a shortened signal in which a symbol onto which the transmission data is not mapped is arranged only in the rear of one subframe may be generated. In which of the front and rear of one subframe a symbol onto which transmission data is not mapped is arranged may be determined, for example, according to the direction in which the terminal device 200 moves.

In other words, for example, when the terminal device 200 moves in a direction in which the terminal device 200 gets close to the base station device 100, the timing of transmission by the terminal device 200 tends to be ahead of the synchronization reference timing and thus a shortened signal in which transmission data is not mapped onto only the front symbol may be generated. On the contrary, when the terminal device 200 moves in a direction in which the terminal device 200 gets apart from the base station device 100, the timing of transmission by the terminal device 200 tends to be behind the synchronization reference timing and thus a shortened signal in which transmission data is not mapped onto only the rear symbol may be generated.

The direction in which the terminal device 200 moves may be estimated by the base station device 100 and the terminal device 200 may be notified of the direction. In general, when the terminal device 200 is moving in the direction in which the terminal device 200 gets close to the base station device 100, a propagation loss decreases and, on the contrary, when the terminal device 200 is moving in the direction in which the terminal device 200 gets apart from the base station device 100, a propagation loss increases. For this reason, the base station device 100 may estimate the direction in which the terminal device 200 moves based on the transition of the propagation loss of an uplink signal from the terminal device 200 and notify the terminal device 200 of the result of estimation. Furthermore, the base station device 100 may notify the terminal device 200 of information indicating onto which one of the front and rear symbols data is not mapped and information indicating how many symbols onto which data is not mapped.

As described above, according to the present embodiment, also after the given time T1 elapses after the uplink signal transmission timing is adjusted, the terminal device generates a shortened signal in which transmission data is not mapped onto at least the front or rear of one subframe and transmits the shortened signal to the base station device. Thus, the terminal device is able to, after the transmission timing is adjusted, transmit uplink signals without executing random access processing over a relatively long time and thus is able to inhibit the throughput from decreasing. After the given time T1 elapses, a shortened signal in which transmission data is not mapped onto the front or rear is transmitted and thus interference with an uplink signal that is transmitted from another terminal device can be kept low.

In the first embodiment, the given times T1 and T2 that are set in the timer unit 204 of the terminal device 200 may be specified by the base station device 100. The values of the given times T1 and T2 may differ depending on the terminal device or the values of the given times T1 and T2 may be changed in the same terminal device.

[b] Second Embodiment

The characteristics of a second embodiment is that a base station device instructs a terminal device to generate a shortened signal based on timing of reception of an uplink signal and thus management of the uplink synchronous state by a timer is not needed.

Figure 7:
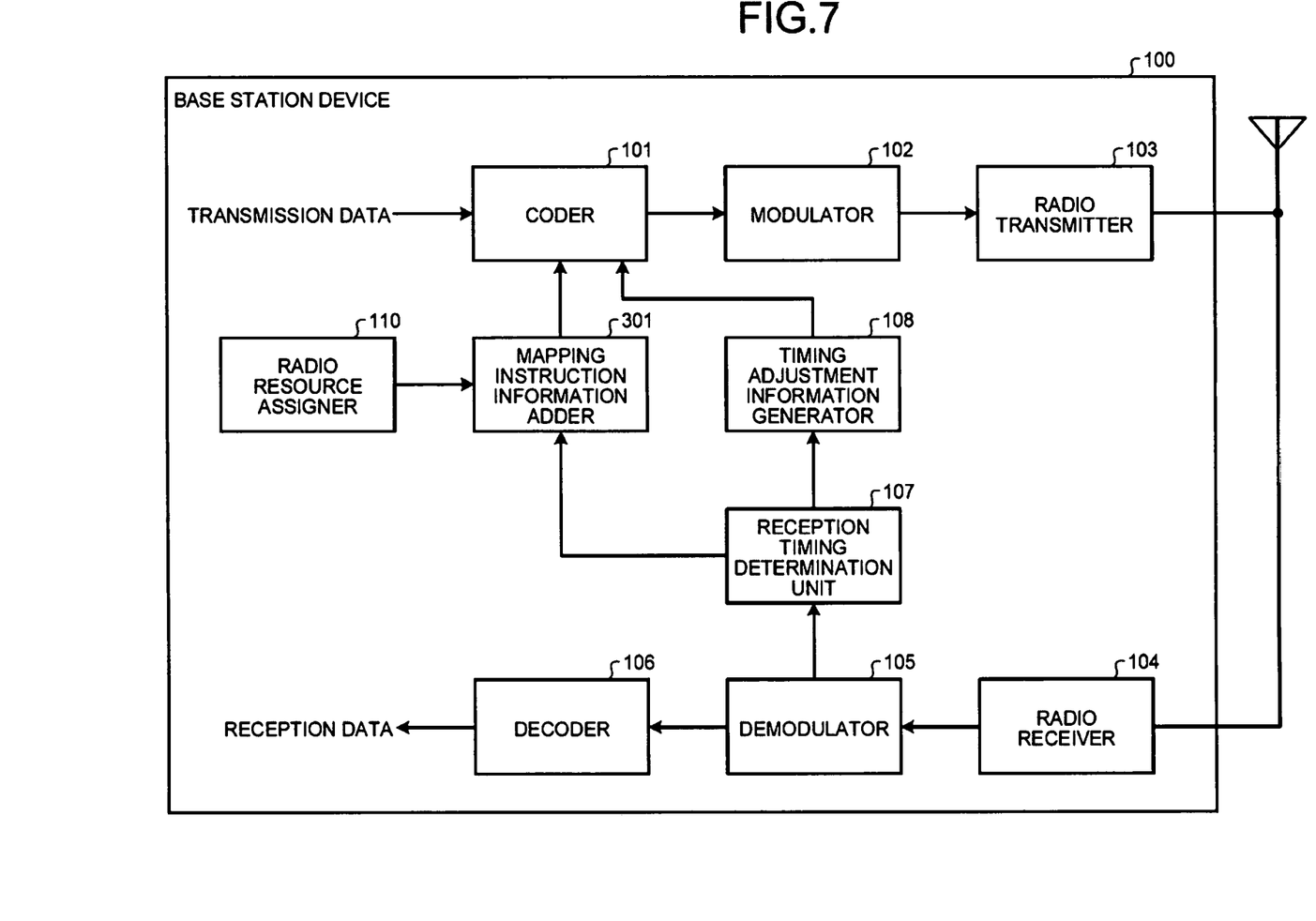
FIG. 7 is a block diagram illustrating a configuration of a base station device according to a second embodiment.

The configuration of a radio communication system according to the second embodiment is the same as that of the first embodiment (FIG. 1) and thus descriptions thereof will be omitted. FIG. 7 is a block diagram illustrating a configuration of the base station device 100 according to the second embodiment. The same components in FIG. 7 as those in FIG. 2 are denoted with the same reference numerals and descriptions thereof will be omitted. The base station device 100 illustrated in FIG. 7 includes a mapping instruction information adder 301 instead of the timer unit 109 of the base station device 100 illustrated in FIG. 2.

The mapping instruction information adder 301 adds mapping instruction information to transmission grant information to be transmitted to the terminal device 200 according to a result of determination on the timing of reception of a reception signal from the terminal device 200, which is determination made by the reception timing determination unit 107. Specifically, when the difference between timing of reception of an uplink signal from the terminal device 200 and a synchronization reference timing exceeds a desired value, the mapping instruction information adder 301 adds mapping instruction information of an instruction to generate a shortened signal to transmission grant information to the terminal device 200. When the difference between the uplink signal reception timing and the synchronization reference timing is equal to or larger than the given value, the mapping instruction information adder 301 may determine that the uplink from the terminal device 200 is in the asynchronous state.

The mapping instruction information adder 301 may add, to transmission grant information, mapping instruction information of an instruction to generate a shortened signal in which the number of symbols onto which transmission data is not mapped differs according to the degree of the difference between the reception timing and the synchronization reference timing. In other words, the terminal device 200 may be instructed to generate a shortened signal in which, the more the difference between the reception timing and the synchronization reference timing increases, the larger the number of symbols onto which transmission data is not mapped is. The number of symbols onto which transmission data is not mapped may be unequal between the front and the rear of one subframe.

In a shortened signal for which an instruction to generate is issued using mapping instruction information, symbols onto which transmission data is not mapped are not necessarily arranged in both the front and rear of one subframe. In other words, an instruction to generate a shortened signal in which a symbol onto which transmission data is not mapped is arranged only in the front of one subframe may be issued or an instruction to generate a shortened signal in which a symbol onto which transmission data is not mapped is arranged only in the rear of one subframe may be issued. In which of the front and the rear of one subframe a symbol onto which transmission data is not mapped is arranged may be determined, for example, according to a direction in which the terminal device 200 moves.

In other words, for example, when the terminal device 200 moves in a direction in which the terminal device 200 gets close to the base station device 100, the timing of transmission by the terminal device 200 tends to be ahead of the synchronization reference timing and thus an instruction to generate a shortened signal in which transmission data is not mapped onto only the front symbol may be issued. On the contrary, when the terminal device 200 moves in a direction in which the terminal device 200 gets apart from the base station device 100, the timing of transmission by the terminal device 200 tends to be behind the synchronization reference timing and thus an instruction to generate a shortened signal in which transmission data is not mapped onto only the rear symbol may be issued.

The direction in which the terminal device 200 moves may be estimated based on a propagation loss of an uplink signal from the terminal device 200. In general, when the terminal device 200 is moving in the direction in which the terminal device 200 gets close to the base station device 100, a propagation loss reduces and, on the contrary, when the terminal device 200 is moving in the direction in which the terminal device 200 gets apart from the base station device 100, a propagation loss increases. For this reason, the base station device 100 may estimate the direction in which the terminal device 200 moves based on the transition of the propagation loss of an uplink signal from the terminal device 200.

Figure 8:
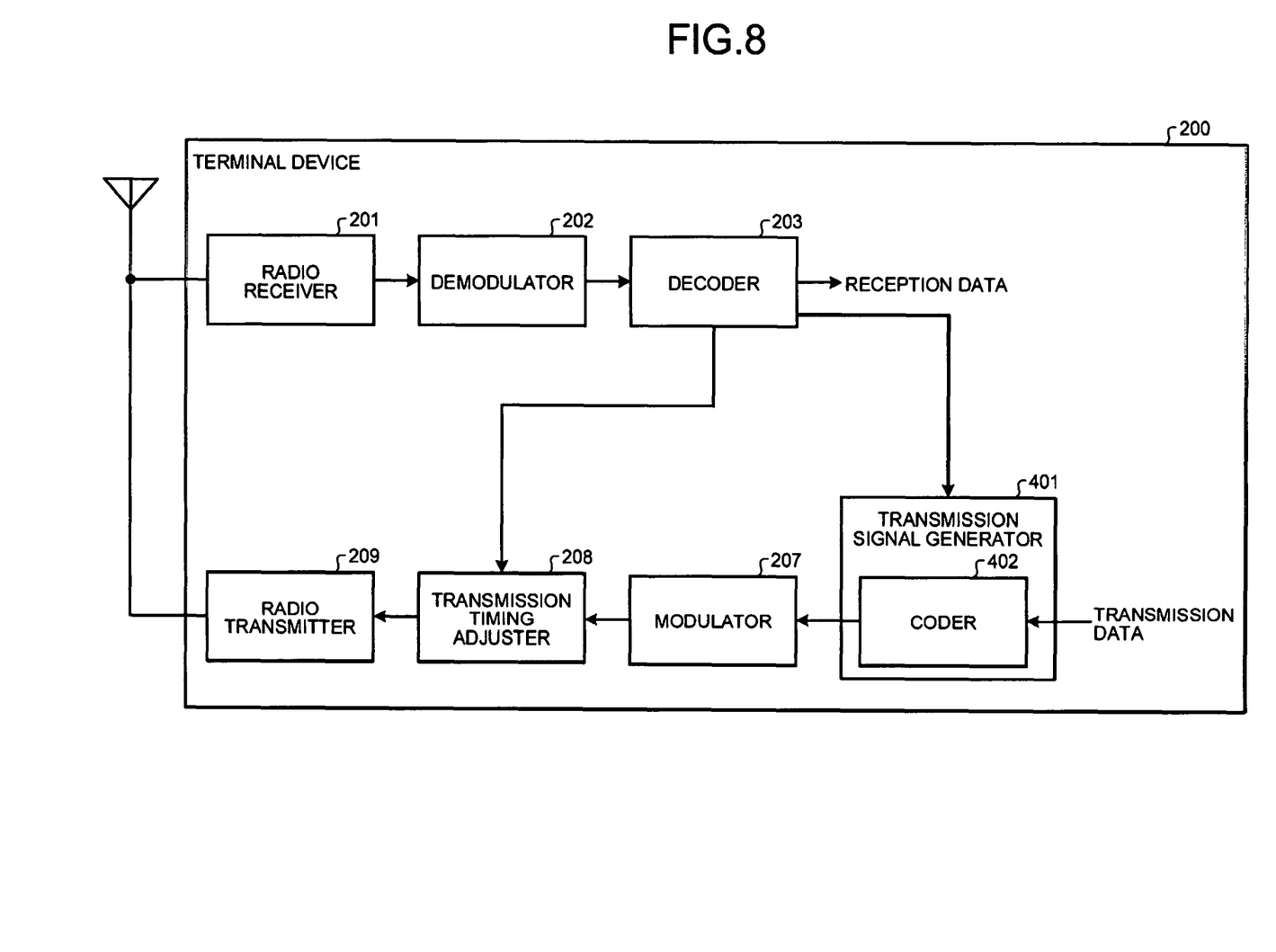
FIG. 8 is a block diagram illustrating a configuration of the terminal device according to the second embodiment.

FIG. 8 is a block diagram illustrating a configuration of the terminal device 200 according to the second embodiment. The same components in FIG. 8 as those in FIG. 3 are denoted with the same reference numerals and descriptions thereof will be omitted. The terminal device 200 illustrated in FIG. 8 includes a transmission signal generator 401 instead of the timer unit 204 and the transmission signal generator 205 of the terminal device 200 illustrated in FIG. 3.

When transmission grant information is output from the decoder 203, the transmission signal generator 401 maps transmission data to generate a transmission signal. Specifically, the transmission signal generator 401 includes a coder 402. When transmission grant information to grant transmission of uplink signals is received, the coder 402 codes transmission data and outputs the resultant coded data to the modulator 207.

The transmission signal generator 401 executes mapping that differs depending on whether mapping instruction information is added to the transmission grant information. In other words, when no mapping instruction information is added to the transmission grant information, for example, the transmission signal generator 401 maps the transmission data onto all multiple symbols of one subframe to generate a transmission signal. On the other hand, when mapping instruction information is added to the transmission grant information, the transmission signal generator 401 generates a shortened signal according to the mapping instruction information.

When the transmission signal generator 401 generates a shortened signal, for example, after the coder 402 codes transmission data, a shortened signal in which transmission data is not mapped onto the front or rear symbol may be generated by puncturing to interpolate coded bits. Alternatively, the code rate may be adjusted such that all data that is to be transmitted is within the number of symbols to be used actually (rate matching). In this case, the code rate is adjusted according to a pre-determined processing method and thus the base station device 100 need not be notified of the value of the adjusted code rate. For example, the coder 402 may code transmission data by a code rate different from the code rate that is specified by the base station device 100 and reduce redundant bits that are added to transmission data to generate a shortened signal. Furthermore, for example, the coder 402 may reduce an amount of transmission data to be assigned to one subframe to generate a shortened signal. When these two signal processing methods are performed, the terminal device 200 may notify the base station device 100 of information on the applied code rate or the amount of transmission data in the same subframe.

Figure 9:
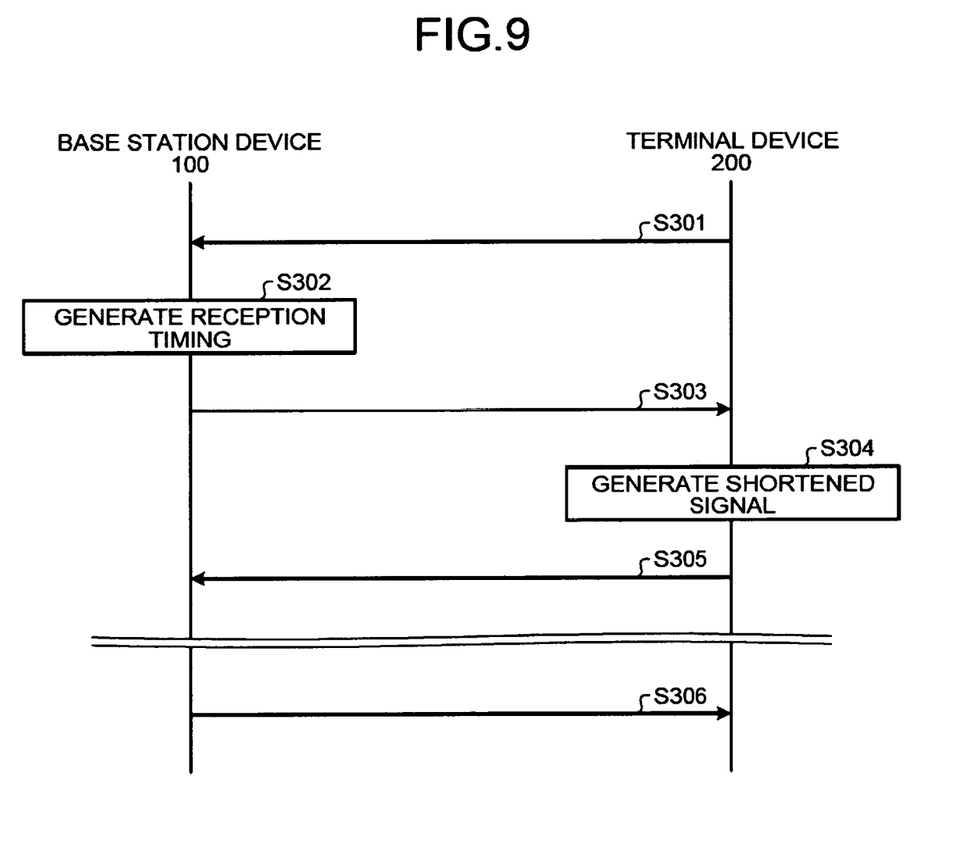
FIG. 9 is a sequence chart illustrating a radio communication method according to the second embodiment.

A radio communication method in the radio communication system configured as described above will be described with reference to the sequence chart represented in FIG. 9.

When the terminal device 200 transmits an uplink signal (step S301), the uplink signal is received by the base station device 100. The uplink signal need not necessarily contain data and, for example, may be a pilot signal that is transmitted by the terminal device 200 to measure radio characteristics of the uplink. In LTE, for example, a sounding reference signal (SRS) is used as such a pilot signal. When the uplink signal from the terminal device 200 is received by the base station device 100, whether it is the synchronous state or the asynchronous state is determined by the reception timing determination unit 107 from the difference between the uplink signal reception timing and the synchronization reference timing (step S302). When the difference between the reception timing and the synchronization reference timing is equal to or smaller than the given value, it is the synchronous state and, when the difference exceeds the given value, it is the asynchronous state, When it is determined that it is the asynchronous state, it is determined by the mapping instruction information adder 301 to transmit mapping instruction information to instruct the terminal device 200 to generate a shortened signal. When radio resources are assigned to the terminal device 200 as a consequence of scheduling performed by the radio resource assigner 110, the mapping instruction information adder 301 adds mapping instruction information to transmission grant information to the terminal device 200. The mapping instruction information is information of an instruction to generate a shortened signal in which data is not mapped onto at least a single or multiple front or rear symbols of one subframe. The mapping instruction information may specify the positions and the number of symbols onto which data is not mapped.

The transmission grant information to which the mapping instruction information is added is transmitted from the base station device 100 (step S303) and is received by the terminal device 200. When the decoder 203 of the terminal device 200 decodes the transmission grant information and the mapping instruction information, the information is output to the transmission signal generator 401. As the mapping instruction information is received together with the transmission grant information, the transmission signal generator 401 generates a shortened signal in which transmission data is not mapped onto the front or rear symbol of one subframe (step S304). When generating a shortened signal, the transmission signal generator 401 determines a symbol onto which transmission data is not mapped according to the mapping instruction information. The shortened signal is transmitted to the base station device 100 at the transmission timing that is adjusted by the transmission timing adjuster 208 (step S305).

In the present embodiment, even when the difference between the timing of reception of an uplink signal from the terminal device 200 in the base station device 100 and the synchronization reference timing exceeds the reference value, a shortened signal is transmitted from the terminal device 200. Accordingly, a part of an uplink signal from the terminal device 200 onto which transmission data is not mapped is received by the base station device 100 simultaneously with an uplink signal that is transmitted from another terminal device and thus interference between uplink signals does not occur.

Even after the difference between the uplink signal transmission timing and the synchronization reference timing is larger than the given value, the terminal device 200 is able to transmit uplink signals without executing random accesses anew. In other words, the terminal device 200 is able to transmit uplink signals promptly and inhibits the throughput from decreasing. Furthermore, the base station device 100 and the terminal device 200 are able to switch generating and not generating a shortened signal without managing the elapsed time after establishment of synchronization with timers. As a result, it is unnecessary to use timers for the purpose of managing the radio uplink synchronous state and it is possible to reduce the circuit scale in both the base station device 100 and the terminal devices 200.

Also during transmission of a shortened signal as an uplink signal, determination on the synchronous state is made by the reception timing determination unit 107 of the base station device 100 based on the reception timing. When it enters the asynchronous state, timing adjustment information is generated by the timing adjustment information generator 108 and is transmitted to the terminal device 200 (step S306). Note that timing adjustment information need not be transmitted to the terminal device 200 immediately when it enters the asynchronous state. For example, when the number of terminal devices 200 being connected to the base station device 100 is large and it is difficult to secure radio resources for transmitting timing adjustment information, transmission of the timing adjustment information may be delayed. The transmission timing adjuster 208 of the terminal device 200 adjusts transmission timing according to the received timing adjustment information. As a result, it is possible in the base station device 100 to maintain the difference between timing of reception of an uplink signal from the terminal device 200 and the synchronization reference timing at the given value or smaller and thus the synchronous state is obtained. When the synchronous state is achieved, the mapping instruction information adder 301 stops addition of mapping instruction information to transmission grant information to the terminal device 200.

As described above, according to the present embodiment, even after the difference between the uplink signal reception timing and the synchronization reference timing gets larger than the given value, that is, even after it enters the asynchronous state, the base station device instructs the terminal device to transmit a shortened signal in which data is not mapped onto at least a single or multiple front or rear symbols of one subframe. The terminal device generates a shortened signal according to the instruction from the base station device and transmits the shortened signal to the base station device. Thus, after the transmission timing is adjusted, the terminal device is able to transmit uplink signals over a relatively long time without executing the random access processing and inhibit the throughput from decreasing. After the synchronization ends, as a shortened signal in which transmission data is not mapped onto the front or rear is transmitted from the terminal device, there is no interference with an uplink signal that is transmitted from another terminal device. Furthermore, as it is unnecessary to manage the time after establishment of synchronization with timers, it is possible to reduce the processing load of the base station device and the terminal devices and thus reduce the circuit scale.

In each of the above-described embodiments, timing adjustment information is transmitted according to the processing load of the base station device 100 and the degree of sufficiency of available radio resources; however, timing adjustment information may be transmitted, for example, together with reception acknowledgment to an uplink signal. In other words, when an uplink signal is received correctly, timing adjustment information is transmitted together with ACK indicating that reception has succeeded and, when an uplink signal is not received correctly, timing adjustment information may be transmitted together with NACK indicating that reception fails. As the base station device 100 adds mapping instruction information into transmission grant information to be transmitted to the terminal device 200, the terminal device 200 determines whether mapping instruction information is contained in the received transmission grant information. For example, two types of control signals containing transmission grant information may be prepared and mapping instruction information may be added to one type and no mapping instruction information may be added to the other type to make it possible to determine whether there is mapping instruction information based on the type of control signal. In this case, for example, it may be possible to determine the type of control signal according to the size of control signal and the type of scrambling code array for scrambling performed on an area (such as a cyclic redundancy checker) in the control signal.

According to the embodiments, a radio communication system, a terminal device, a base station device and a radio communication method achieve an effect that the throughput can be inhibited from decreasing.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication system comprising a first radio device and a second radio device,
    the first radio device including:
    a generator configured to generate a transmission signal sent to the second radio device;
    an adjuster configured to adjust timing of transmission of the transmission signal generated by the generator according to information on transmission timing;
    a transmitter configured to transmit the transmission signal at the timing of transmission adjusted by the adjuster; and
    a timer configured to be reset each time the information on transmission timing is obtained and to measure elapsed time from the resetting, wherein
    the generator generates a shortened transmission signal in which at least one symbol in a front part or a rear part contains no data when the elapsed time measured by the timer is equal to or larger than a first threshold, and
    the transmitter stops, when the elapsed time measured by the timer is equal to or larger than a second threshold that is larger than the first threshold, transmitting the transmission signal.

2. The radio communication system according to claim 1, wherein the second radio device is configured to transmit, together with transmission grant information, information indicating which of the front part and the rear part of the transmission signal has a symbol containing no data.

3. A terminal device comprising:
    a generator that generates a transmission signal;
    an adjuster that can adjust timing of transmission of the transmission signal generated by the generator according to information on transmission timing;
    a transmitter that transmits the transmission signal at the timing of transmission adjusted by the adjuster; and
    a timer that is reset each time the information on transmission timing is obtained and measures elapsed time from the resetting, wherein
    the generator generates a shortened transmission signal in which at least one symbol in a front part or a rear part contains no data when the elapsed time measured by the timer is equal to or larger than a first threshold, and
    the transmitter stops, when the elapsed time measured by the timer is equal to or larger than a second threshold that is larger than the first threshold, transmitting the transmission signal.

* * * * *